United States Patent
Takashima et al.

(10) Patent No.: US 9,215,175 B2
(45) Date of Patent: Dec. 15, 2015

(54) COMPUTER SYSTEM INCLUDING CONTROLLER AND PLURALITY OF SWITCHES AND COMMUNICATION METHOD IN COMPUTER SYSTEM

(75) Inventors: Masanori Takashima, Tokyo (JP); Tomohiro Kase, Tokyo (JP); Hiroshi Ueno, Tokyo (JP); Takahisa Masuda, Tokyo (JP); Suhun Yun, Tokyo (JP)

(73) Assignee: NEC Corporation, Tokyo (JP)

( * ) Notice: Subject to any disclaimer, the term of this patent is extended or adjusted under 35 U.S.C. 154(b) by 315 days.

(21) Appl. No.: 13/821,926

(22) PCT Filed: Sep. 5, 2011

(86) PCT No.: PCT/JP2011/070137
§ 371 (c)(1),
(2), (4) Date: Mar. 8, 2013

(87) PCT Pub. No.: WO2012/033041
PCT Pub. Date: Mar. 15, 2012

(65) Prior Publication Data
US 2013/0170354 A1     Jul. 4, 2013

(30) Foreign Application Priority Data
Sep. 9, 2010  (JP) ................. 2010-202468

(51) Int. Cl.
*H04L 12/28*  (2006.01)
*H04L 12/801* (2013.01)
*H04L 12/717* (2013.01)
*H04L 12/46*  (2006.01)
*H04J 1/16*   (2006.01)
(Continued)

(52) U.S. Cl.
CPC .............. *H04L 47/12* (2013.01); *H04L 12/462* (2013.01); *H04L 45/38* (2013.01); *H04L 45/42* (2013.01); *H04L 45/24* (2013.01); *H04L 45/66* (2013.01)

(58) Field of Classification Search
USPC .................................. 370/389, 252, 386, 399
See application file for complete search history.

(56) References Cited

U.S. PATENT DOCUMENTS 7,225,269 B2  5/2007  Watanabe
2002/0109879 A1 * 8/2002  Wing So ................... 359/118
(Continued)

FOREIGN PATENT DOCUMENTS

EP   0 933 153 A1    4/2000
JP   2003-229913 A   8/2003
JP   2004-56340 A    2/2004
(Continued)

OTHER PUBLICATIONS

PCT/ISA/237 ( English translation of written opinion of the international searching authority, dated Sep. 27, 2011).
(Continued)

*Primary Examiner* — John Pezzlo
(74) *Attorney, Agent, or Firm* — McGinn IP Law Group, PLLC

(57) ABSTRACT

A computer system of the present invention includes a controller which sets a flow entry to each of a plurality of switches before a packet is forwarded from a plurality of nodes, and each of switches which transfers a reception packet which contains a destination address defined in the flow entry, to a destination node defined in the flow entry regardless of a transmission source address of the reception packet.

9 Claims, 13 Drawing Sheets

(51) Int. Cl.
 H04L 12/721 (2013.01)
 H04L 12/707 (2013.01)

(56) References Cited

U.S. PATENT DOCUMENTS

2007/0064689 A1* 3/2007 Shin et al. .................. 370/389
2010/0325257 A1* 12/2010 Goel et al. .................. 709/223

FOREIGN PATENT DOCUMENTS

JP 2004-126959 A 4/2004
JP 2010-141731 A 6/2010

OTHER PUBLICATIONS

PCT/IB/373.
Taiwanese Office Action dated Apr. 18, 2014 with English translation of relevant portion.
Nick McKeown et al., "Open Flow: Enabling Innovation in Campus Networks", Mar. 14, 2008.
OpenFlow Switch Specification Version 0.8.9 (Wire Protocol 0x97) Dec. 2, 2008.
International Search Report (ISR) (PCT Form PCT/ISA/210) dated Sep. 27, 2011, in PCT/JP2011/070137.
OpenFlow Switch Specification Version 1.0.0 (Wire Protocol 0x01) Dec. 31, 2009.
Yoshihiko Kanaumi et al., "The demonstration experience of OpenFlow on JGN2plus", The Institute of Electronics, Information and Communication Engineers Sogo Taikai Koen Ronbunshu 2009, Tsushin 2, Mar. 4, 2009, pp. S-135 to S-136(BS-10-4), "2 OpenFlow no Gaiyo".
Yokota, et al., "[Shorei Koen] Priority Control for Diversified Flow Sizes", IEICE Technical Report, vol. 108, No. 286, Nov. 6, 2008, age 21, right column, lines 2 to 12.
Russian Office Action dated Jan. 22, 2015 with an English Translation.

* cited by examiner

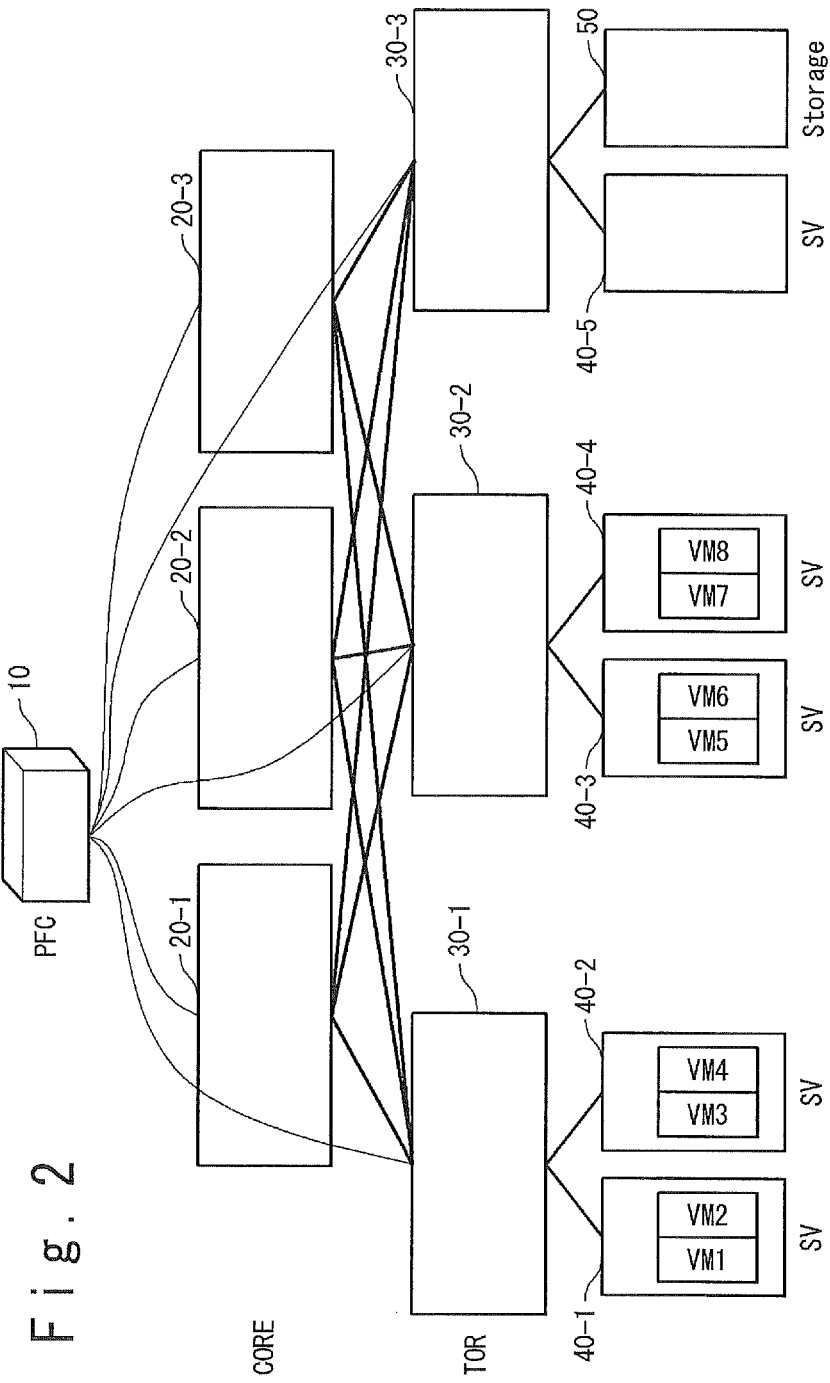

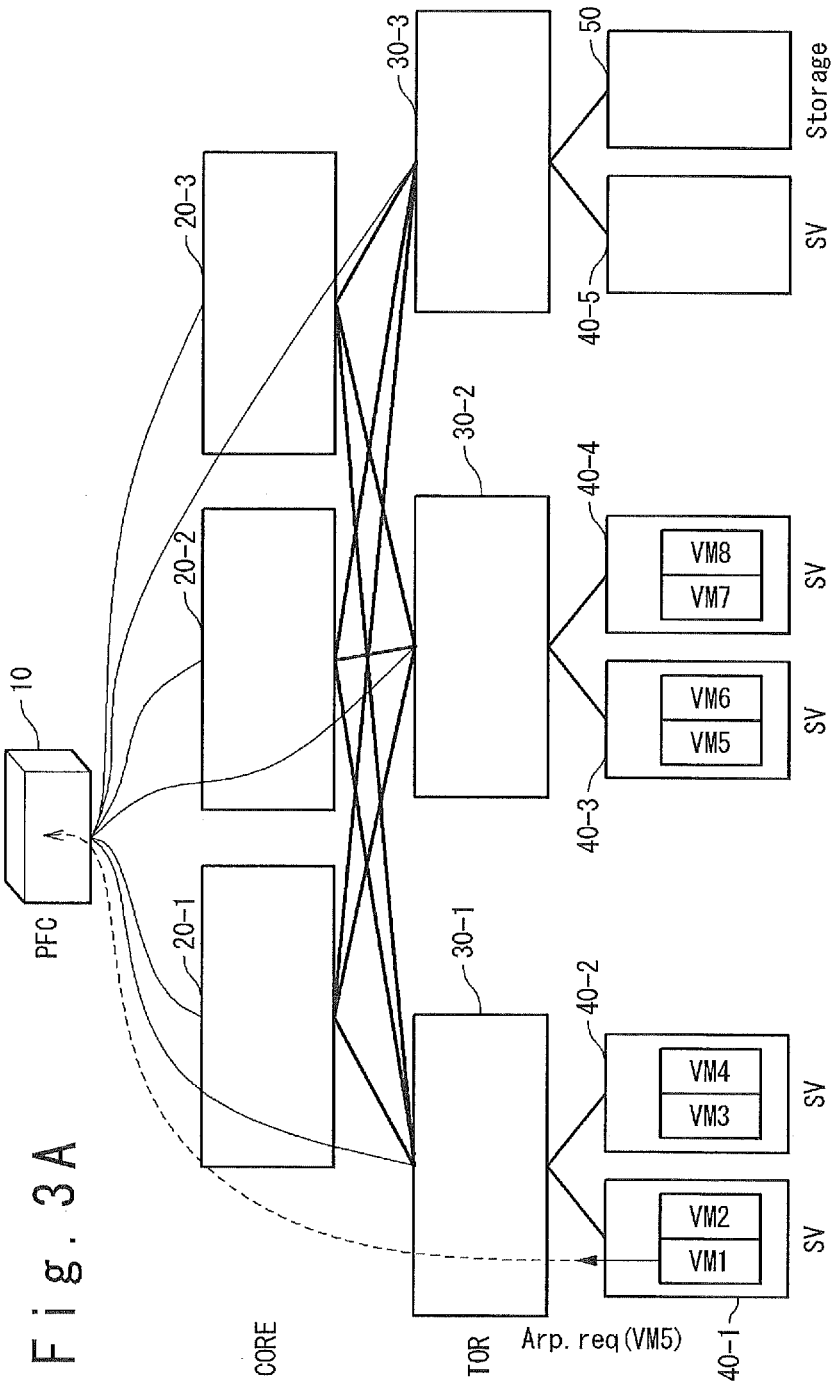

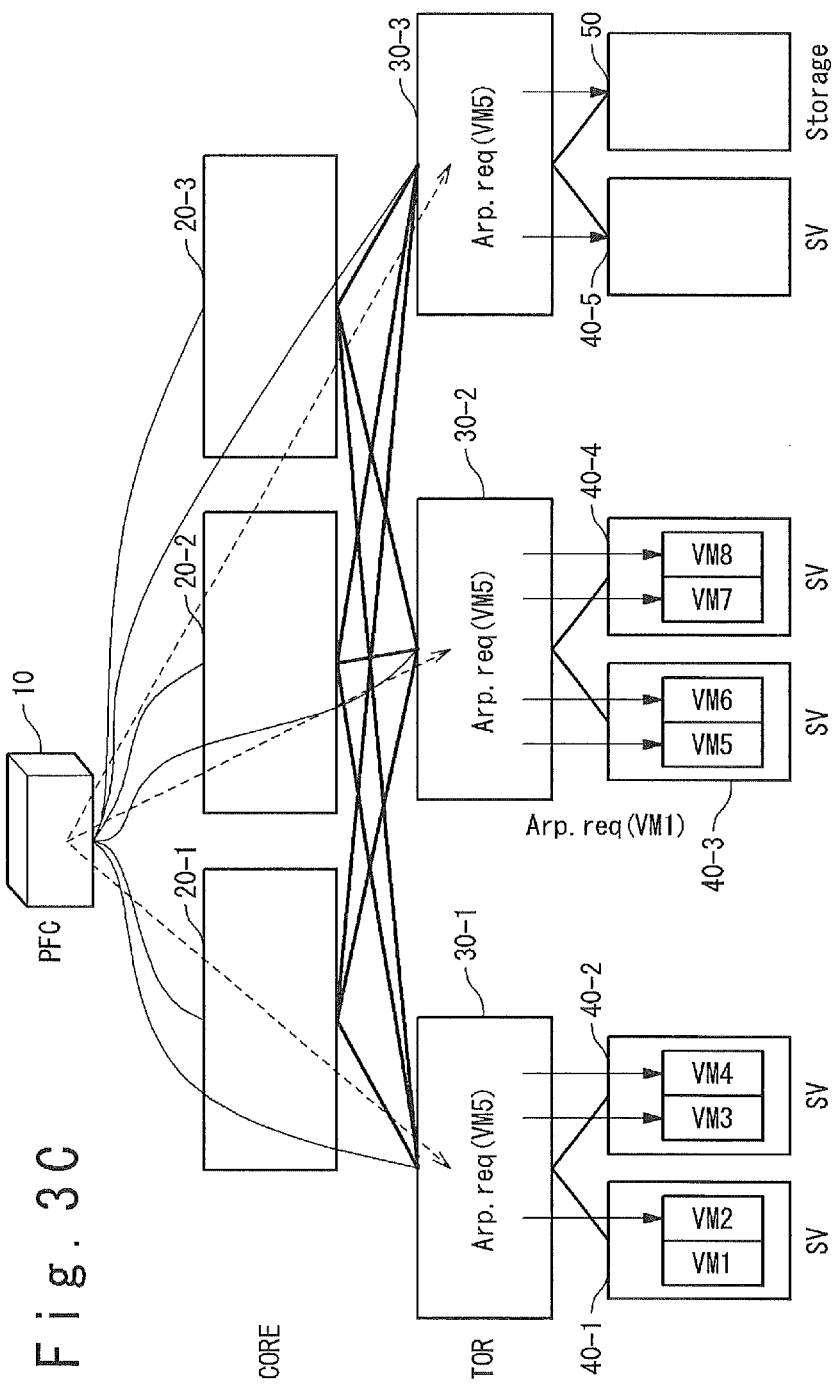

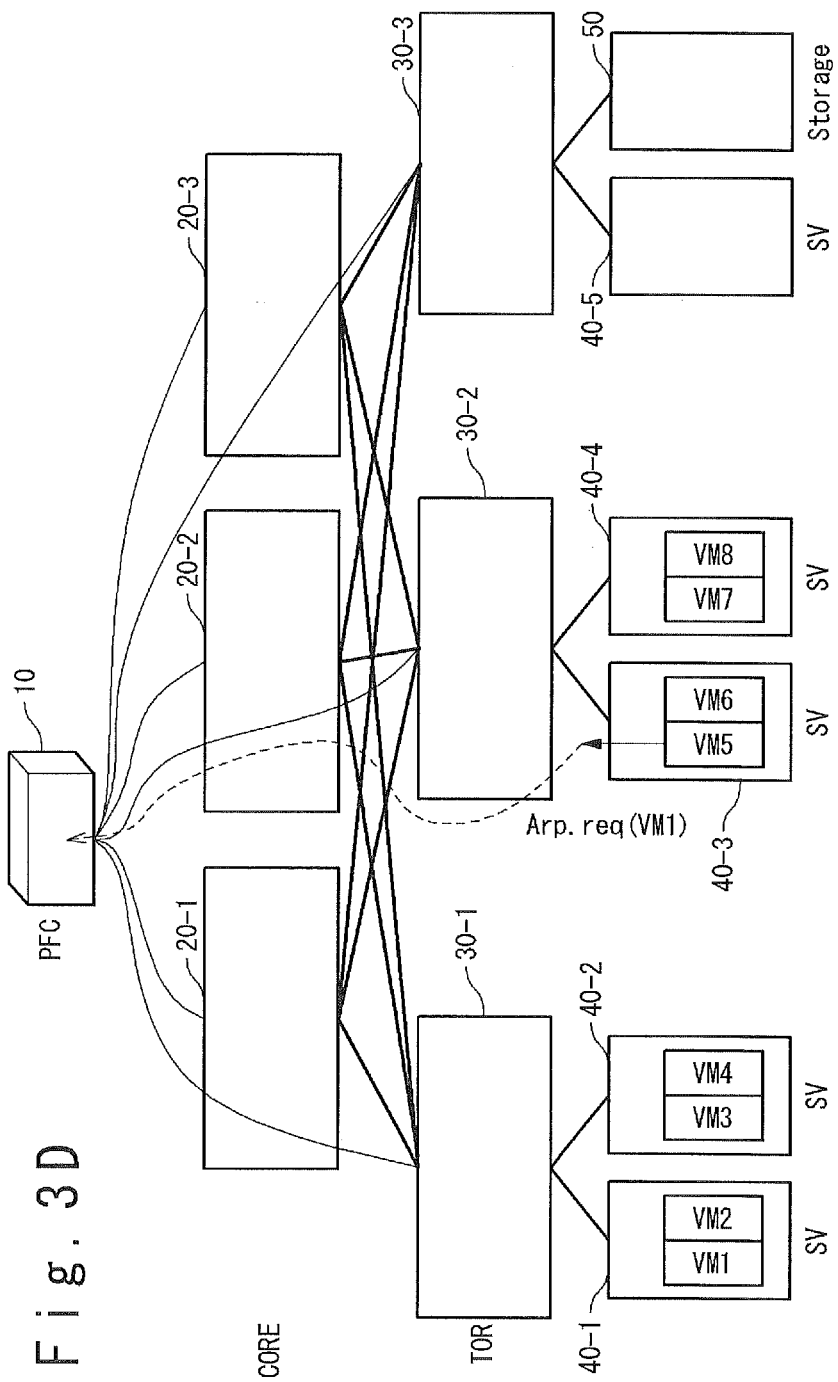

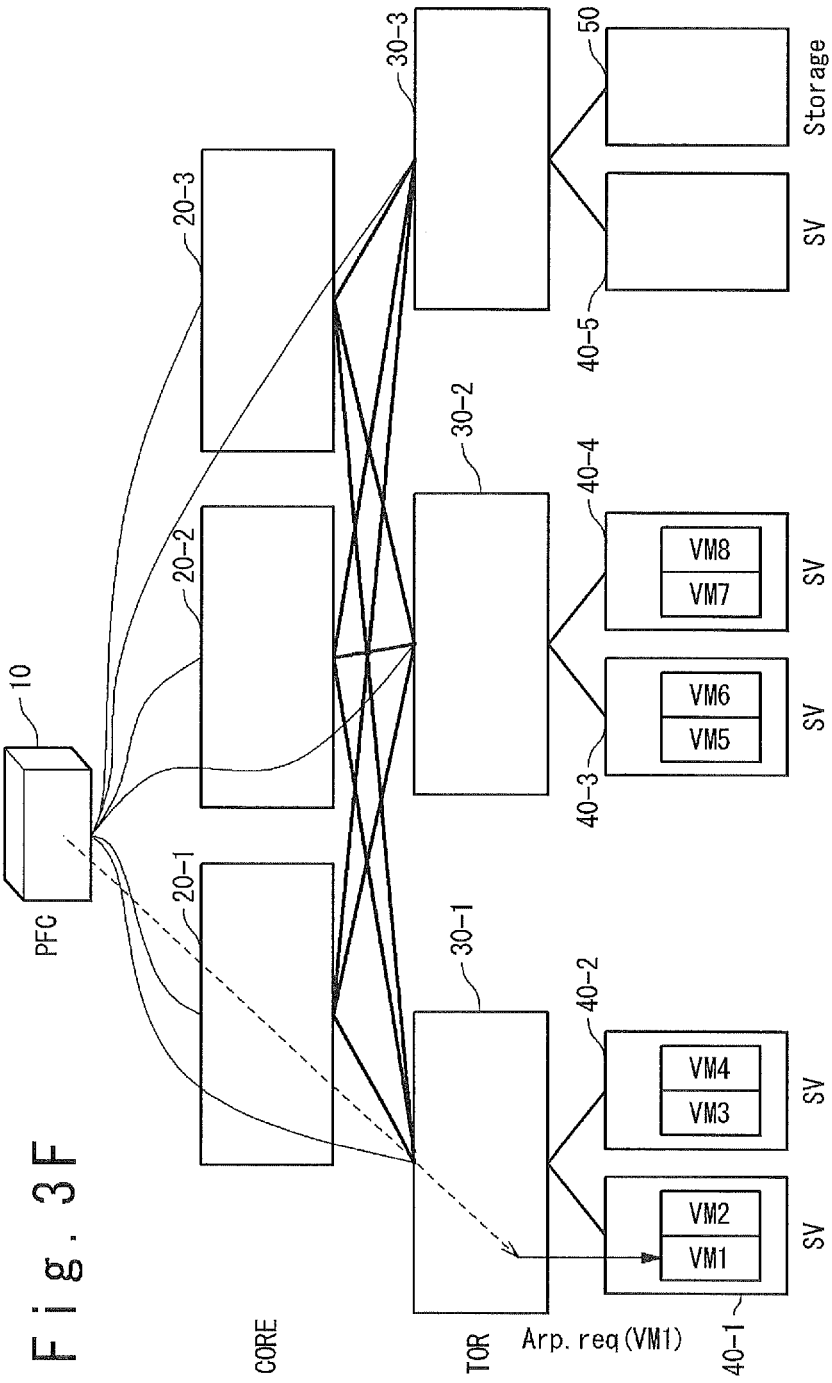

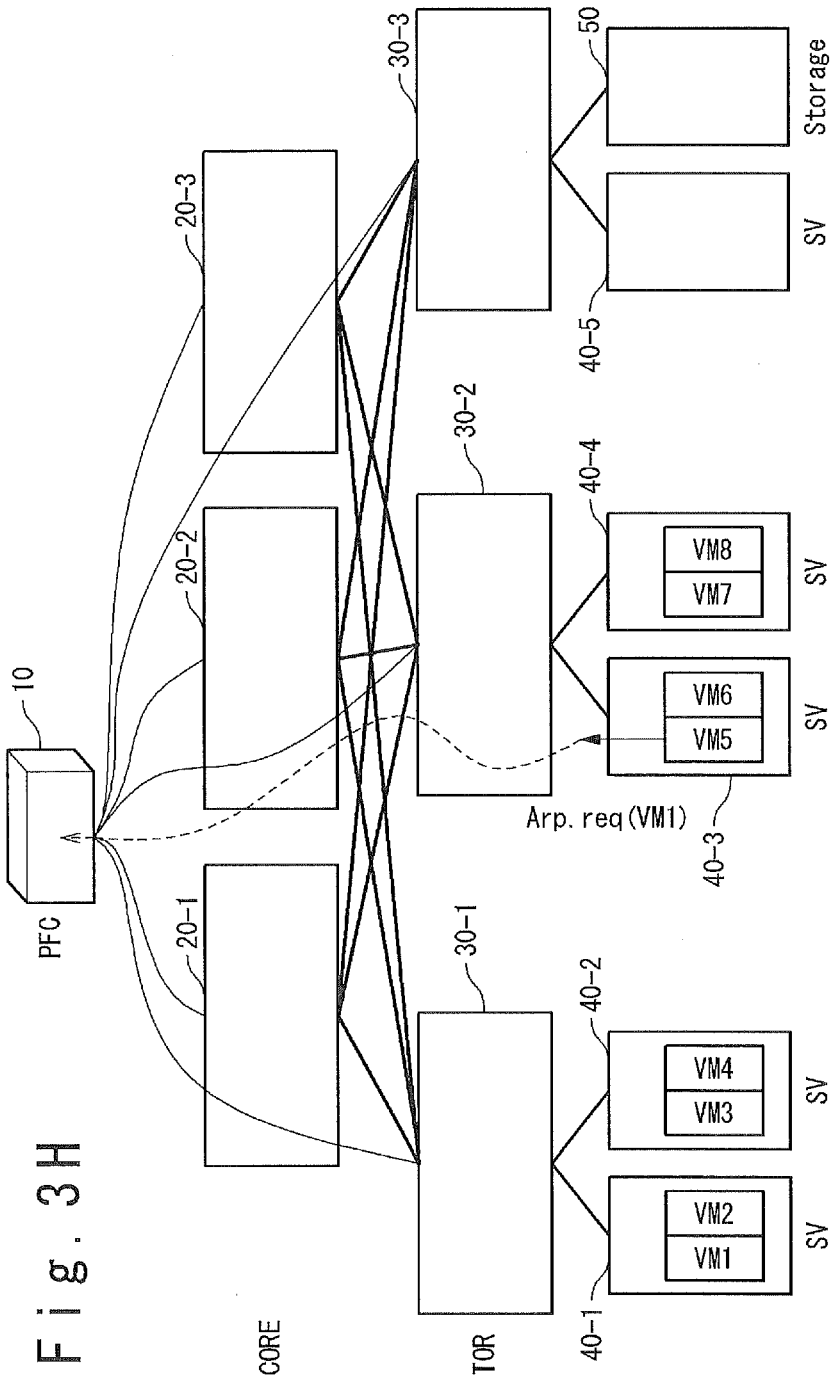

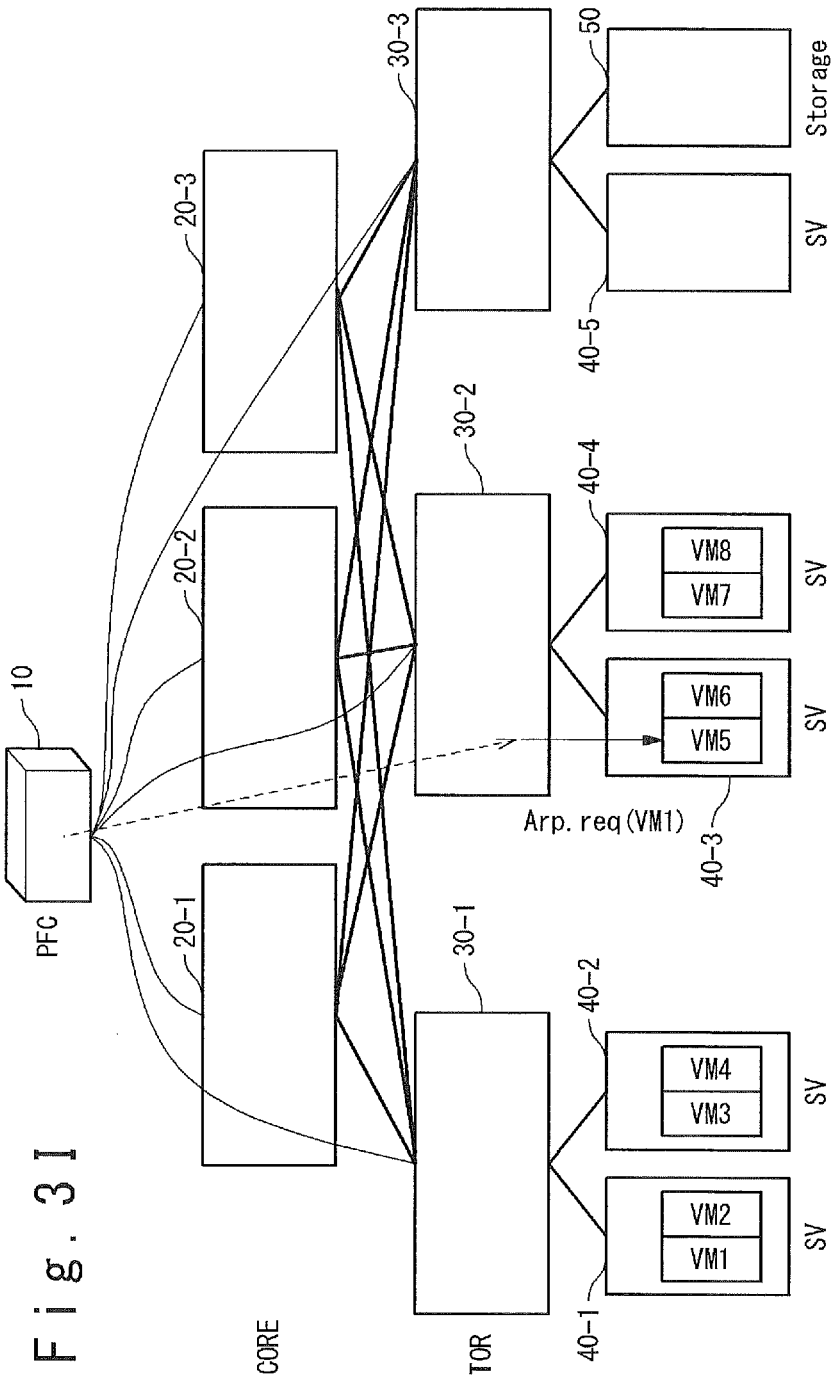

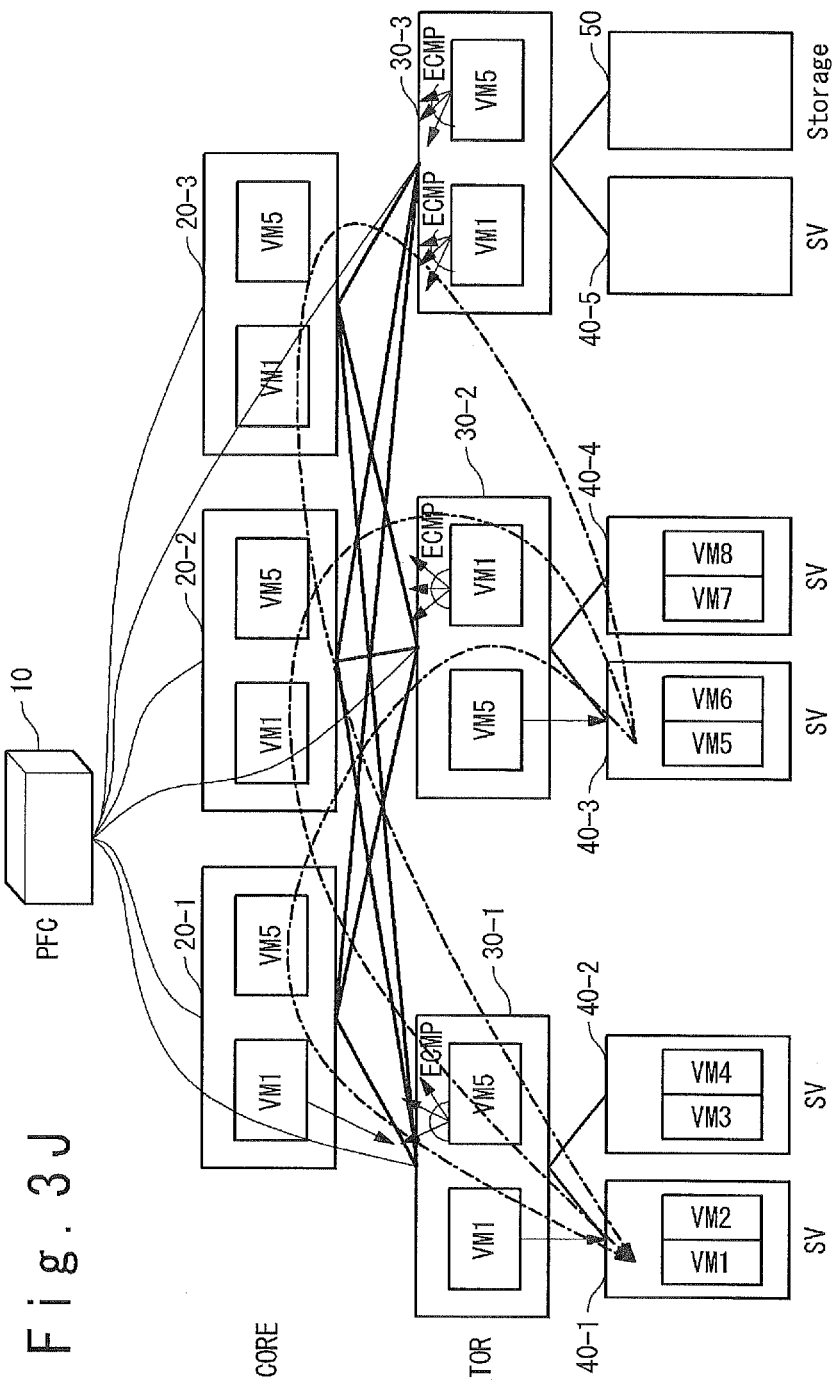

COMPUTER SYSTEM INCLUDING CONTROLLER AND PLURALITY OF SWITCHES AND COMMUNICATION METHOD IN COMPUTER SYSTEM

TECHNICAL FIELD

The present invention relates to a computer system and a communication method in the computer system, and especially, relates to a computer system using an OpenFlow technique.

BACKGROUND ART

In a communication using the Ethernet (Registered trademark), flexibility of a physical link which can be used in a network is lost due to Spanning Tree Protocol (STP), and accordingly a multi-path communication has become gradually impossible.

In order to solve the problem, a route control by the OpenFlow is proposed (reference to Non-Patent Literature 1). A computer system using the OpenFlow technique is disclosed, for example, in JP 2003-229913A (Patent Literature 1). A network switch corresponding to the technique (hereinafter, to be referred to as a programmable flow switch (PFS)) retains detail information such as a protocol type and a port number in a flow table, and can control a flow. It should be noted that the PFS is also referred to as an OpenFlow switch.

FIG. 1 is a diagram showing an example of a configuration of the computer system using the OpenFlow technique. Referring to FIG. 1, a programmable flow controller (PFC, to be referred to as an open flow controller) 100 sets a flow entry to the PFSs 200 and 300 in a single subnet (a P-Flow Network), to perform a flow control in the subnet.

Each of the PFSs 200 and 300 refers to its flow table to execute an action (for example, relay and discard of a data packet) defined in the flow entry, and corresponding to header information of a received packet. Specifically, when a packet transferred between HOSTs 400 is received, each of the PFSs 200 and 300 executes the action defined in the flow entry, if the header information of the received packet conforms to (match to) (a rule of) the flow entry set in its own flow table. On the other hand, when the header information of the received packet does not conform to (match to) (the rule of) the flow entry set in the flow table, each of the PFSs 200 and 300 recognizes the received packet as a first packet, informs the reception of the first packet to the PFC 100, and transmits the header information of the packet to the PFC 100. The PFC 100 sets the flow entry (flow+action) corresponding to the informed header information to the PFS that is an informing source of the first packet.

As described above, in the conventional OpenFlow technique, after any of the PFSs 200 and 300 receives the packet transferred between the HOSTs 400, a transfer control is performed to the packet transmitted and received between the HOSTs 400 by the PFC 100.

CITATION LIST

Patent Literature 1: JP 2003-229913A
Non-Patent Literature 1: OpenFlow Switch Specification Version 1.0.0 (Wire Protocol 0x01) Dec. 31, 2009

SUMMARY OF THE INVENTION

The PFC in the conventional OpenFlow technique sets a route of a packet transferred between a source terminal and a destination terminal and sets a flow entry to the switches on the route. Also, even if the destination is same, the flow entry and the route between the source terminal and the destination terminal must be set every time the packet different in the source terminal is generated. Therefore, when using the OpenFlow technique, there is a fear that resources of the whole system (the number of flow entries) are consumed greatly.

A computer system of the present invention includes a controller; a plurality of switches, each of which performs a relay operation defined in a flow entry set by the controller, to a packet conforming to the flow entry; and a plurality of nodes which communicate through any of the plurality of switches. The controller sets a destination address as a rule of the flow entry and sets transfer processing to the destination node as an action of the flow entry. Each of the plurality of switches transfers the packet containing the destination address, to the destination node based on the flow entry set to the switch, regardless of a source address of the reception packet.

Also, it is desirable that the controller sets the flow entry to each of the plurality of switches before the packet is transferred between the plurality of nodes.

Also, it is desirable that the controller acquires a first MAC (Media Access Control) address of a first node of the plurality of nodes in response to a first ARP (Address Resolution Protocol) request from the first node, and sets the first MAC address to each of the plurality of switches as a rule of the flow entry.

Also, it is desirable that the controller transmits to the first node, an ARP reply having a MAC address of another node of the plurality of nodes as a transmission source, as a reply to the first ARP request from the first node to the other node.

Also, the controller acquires a first MAC (Media Access Control) address of a first node (VM1) based on the first ARP (Address Resolution Protocol) request from a first node of the plurality of nodes, and sets the first MAC address to each of the plurality of switches as the rule of the flow entry. Moreover, it is desirable that the controller issues a second ARP request and sets a second MAC address of a second node acquired based on the reply to the second ARP request, to each of the plurality of switches as the rule of the flow entry Also, the controller transmits to the first node, an ARP reply having the MAC address of said another node as a source address as a reply to a first ARP request destined to another node from the first node. Moreover, it is desirable that the controller transmits to the other node, an ARP reply to a third ARP request destined to the first node and transmitted from the other node.

Also, it is desirable that the plurality of switches includes a plurality of first switches directly connected to the plurality of nodes. In this case, it is desirable that the controller sets the flow entry to optionally selected switches of the plurality of first switches without setting to the remaining switches.

Also, it is desirable that the controller sets the flow entry to each of the plurality of switches to perform ECMP (Equal Cost Multi path) routing on the reception packet.

A communication method of the present invention includes a step of setting by a controller, a flow entry to each of a plurality of switches; a step of performing by each of the plurality of switches, a relay operation defined in the flow entry to a reception packet conforming to the flow entry set by the controller; and a step of communicating by each of a plurality of nodes through each of the plurality of switches. The setting a flow entry includes a step of setting by the controller, a destination address as a rule of the flow entry; and a step of setting transfer processing to a destination node as an action of the flow entry. The communicating includes transferring by each of the plurality of switches, the reception packet containing the destination address to the destination node regardless of a transmission source address of the reception packet.

Also, it is desirable that the setting a flow entry is performed before a packet is transferred among the plurality of nodes.

According to the present invention, the consumption of the resources of the whole computer system using OpenFlow technique can be reduced.

BRIEF DESCRIPTION OF DRAWINGS

Other objects, effects, and features of the above-mentioned invention will be more clarified on the basis of description of exemplary embodiments in conjunction with the attached drawings:

FIG. 2 is a diagram showing an example of a configuration of a computer system according to the present invention;

FIG. 3A is a diagram showing an example of a flow setting method and a communication method in the computer system according to the present invention;

FIG. 3C is a diagram showing the example of the flow setting method and the communication method in the computer system according to the present invention;

FIG. 3D is a diagram showing the example of the flow setting method and the communication method in the computer system according to the present invention;

FIG. 3F is a diagram showing the example of the flow setting method and the communication method in the computer system according to the present invention;

FIG. 3H is a diagram showing the example of the flow setting method and the communication method in the computer system according to the present invention;

FIG. 3I is a diagram showing the example of the flow setting method and the communication method in the computer system according to the present invention;

FIG. 3J is a diagram showing the example of the flow setting method and the communication method in the computer system according to the present invention.

DESCRIPTION OF EXEMPLARY EMBODIMENTS

Figure 1:
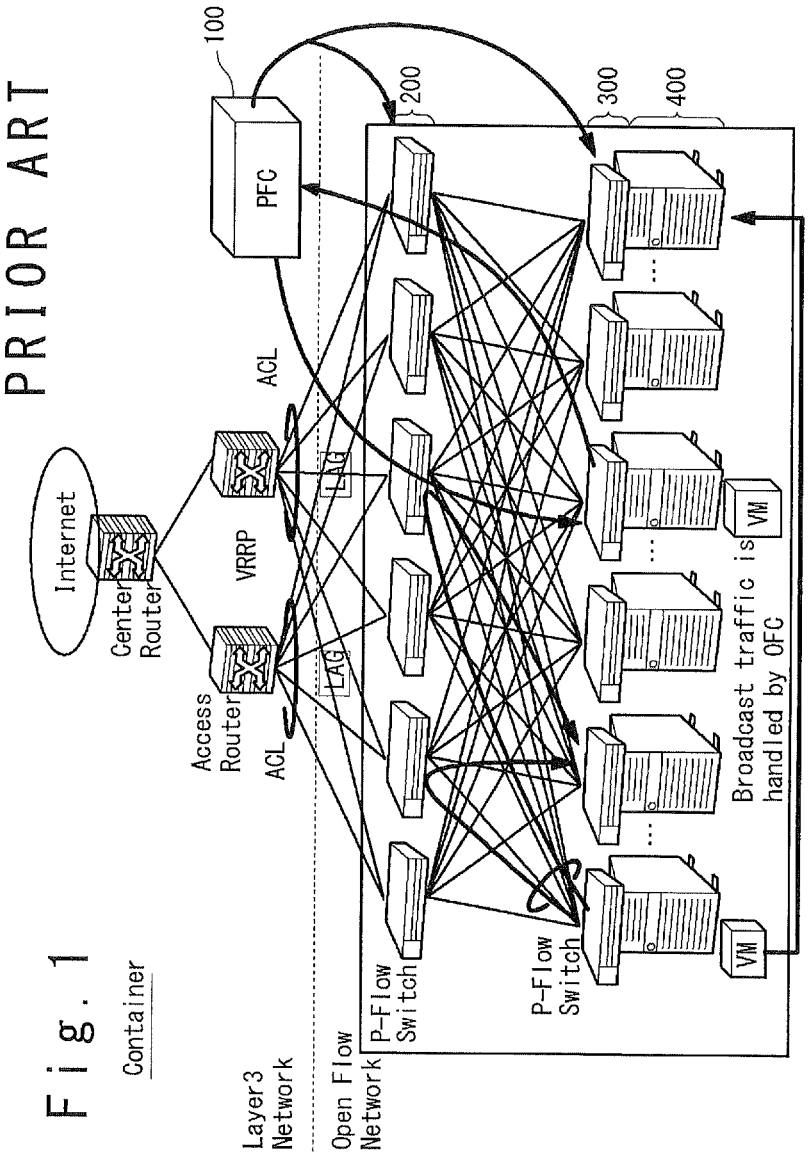
FIG. 1 is a diagram showing an example of a configuration of a computer system using an OpenFlow technique.

Hereinafter, exemplary embodiments of the present invention will be described with reference to attached drawings. In the drawings, the same or similar reference numerals assigned to the same or similar components.
(Configuration of Computer System)

Referring to FIG. 2, a configuration of a computer system according to the present invention will be described. FIG. 2 is a diagram showing an example of the configuration of the computer system according to the present invention. The computer system according to the present invention includes a programmable flow controller 10 (hereinafter, to be referred to as a PFC 10), a plurality of programmable flow switches 20-1 to 20-3 and 30-1 to 30-3 (hereinafter, to be referred to as PFSs 20-1 to 20-3 and 30-1 and 30-3), physical servers 40-1 to 40-5 (hereinafter, to be referred to as SVs 40-1 to 40-5), and a storage 50, which are connected through a communication network. Meanwhile, when the PFSs 20-1 to 20-3 and 30-1 to 30-3 are described without distinguishing them each other, each of the PFSs 20-1 to 20-3 and each of the PFSs 30-1 to 30-3 are referred to as a PFS 20 and a PFS 30, respectively. And, when the SVs 40-1 to 40-5 are described without distinguishing them each other, each of the SVs 40-1 to 40-5 is referred to as an SV 40.

The SV 40 and the storage 50 are computer units each having a CPU, a main storage unit, and an external storage device, which are not shown in the figure, and communicate with the other SVs 40 by executing a program stored in the external storage device. The communication with the SV 40 is performed through the PFSs 20 and 30. In accordance with the executed program, the SV 40 realizes a function exemplified by a Web server, a file server, an application server, a client terminal, and the like. For example, when the SV 40 serves as the Web server, the SV 40 transfers an HTML document and image data in the storage unit (not shown) to another SV 40 (ex. a client terminal) in accordance with a request of the client terminal that is not shown.

The SV 40 includes a virtual machine VM realized by logically or physically dividing a CPU (not shown) and a storage area of the storage unit (not shown). In an example shown in FIG. 2, virtual machines VM1 and VM2 are realized in the SV 40-1, virtual machines VM3 and VM4 are realized in the SV 40-2, virtual machines VM5 and VM6 are realized in the SV 40-3, and virtual machines VM7 and VM8 are realized in the SV 40-4. The virtual machines VM1 to VM8 may be realized by a guest operation system (GOS) emulated on a host operation system (HOS) on each of the servers, or software operating on the GOS.

The virtual machine VM transmits and receives data to and from other devices (for example, a computer unit on an external network and a virtual machine VM in another physical server 40) through virtual switches (not shown) managed by a virtual machine monitor or a physical NIC (not shown). In the present exemplary embodiment, packet communication is performed in accordance with the TCP/IP (Transmission Control Protocol/Internet protocol) as an example.

In addition, the virtual switch (not shown) according to the present invention may be controlled based on the OpenFlow technique to be described later, and may perform a conventional switching operation (layer 2). Moreover, each of the virtual machines VM1 to VM8 and the outside of the physical server are connected to each other in a bridge connection. That is, a direct communication from the outside can be performed on the basis of the MAC addresses and IP addresses of the virtual machines VM1 to VM8.

The PFC 10 controls the communication in the system based on the OpenFlow technique. The OpenFlow technique shows a technique that in accordance with a routing policy (a flow entry: flow and action), a controller (here, the PFC 10) sets a multi-layer structure and route data in units of flows to the PFSs 20 and 30, to perform a route control and a node control. Thus, a route control function is separated from a router and a switch, and the optimum routing and traffic management can be realized by a centralized control by the controller. The PFSs 20 and 30 to which the OpenFlow technique is applied handle not communication in units of hop as in the conventional router and switch but communication as a flow of END2END.

The PFC 10 is realized by a computer having a CPU and a storage unit (not shown). A flow control processing in the PFC 10 is realized by executing a program stored in the storage unit (not shown), and controls operations of the PFSs 20 and 30 (for example, a relay operation of data packets) by setting the flow entry (flow and action) to each of the PFSs 20 and 30.

In addition, MAC addresses of a HOST terminal (the SV 40 and the storage 50) and the virtual machine VM are set to the PFC 10 according to the present invention, before a packet transfer between terminals (e.g. between the virtual machines VM). For example, the PFC 10 acquires the MAC addresses of the HOST terminal and the virtual machine VM in advance in response to an ARP (Address Resolution Protocol).

The PFC 10 generates a flow entry employing the acquired MAC address for a rule, and sets the flow entry to all of the PFSs 20 and 30 in the network. For example, the PFC 10 generates for every PFSs, a flow entry used to designate a transfer destination unit of a packet destined to a MAC address of the virtual machine VM1 and to transfer the packet, and sets the flow entry to all of the switches PFSs 20 and 30 in the network. In the present invention, because a flow is controlled based on only the destination MAC address, a transfer destination of the packet corresponding to the rule (the destination MAC address) set to the flow entry is determined with no relation to a transmission source. For this reason, a flow control can be performed without being conscious of the transmission source of the packet. That is, according to the present invention, because a multi-path for a packet transfer is formed by setting the optimum route for a destination terminal, the optimum multi-path operation can be realized. In addition, because the flow entry can be set to the PFSs without waiting for reception of a first packet, unlike in the conventional technique, the throughput of the network can be improved. Moreover, in the present invention, because the flow entry is generated and set before a packet is transferred between the terminals, that is, before the system operation is started, a processing load for the flow control during the operation is reduced in comparison with the conventional technique.

Additionally, the PFC 10 generates the flow entry employing the acquired MAC address for a rule, and sets the flow entry to ones selected optionally from among the PFSs 20 and 30 in the network, and the flow entry is not set to the remaining PFSs. For example, the flow entry employing the MAC address of the virtual machine VM1 as the rule is set to a selected part of the PFSs 30 connected directly to the HOST terminal (the SV 40 and the storage 50). In this case, when the PFS 30 to which the flow entry is not set receives a packet destined to the virtual machine VM1, the packet is discarded without being transferred to anywhere. In this way, because a transfer destination of packet can be logically separated, one physical network can be divided into a plurality of logical networks, and be operated. It should be noted that when the flow entry defined to discard a packet destined to a specific MAC address is set to a specific PFS, similar effect can be also attained.

Each of the PFSs 20 and 30 includes a flow table (not shown) to which the flow entry is set, and performs processing of a reception packet (for example, a relay process and discard) in accordance with the set flow entry. The PFS 30 is a first stage switch directly connected to the HOST terminal (the SV 40 and the storage 50), and for example, a top-of-rack (TOR) switch is preferably employed for the PFS 30. In addition, for an L2 switch and a L3 switch connected to a second stage or the subsequent from the HOST terminal, for example, a CORE switch is preferably employed in the PFS 20.

Each of the PFSs 20 and 30 refers to its own flow table (not shown), and performs an action (for example, relay and discard of a data packet) defined in the flow entry and corresponding to header data of a reception packet (especially, a destination MAC address). Specifically, each of the PFSs 20 and 30 performs the action defined in the flow entry, when the header data of the reception packet matches to (corresponds with) the flow defined by the flow entry set in its own flow table. In addition, each of the PFSs 20 and 30 does not perform any processing on the packet when the header data of the reception packet does not match to (correspond with) the flow defined by the flow entry set in the flow table. In this case, the PFSs 20 and 30 may inform the reception of the packet to the PFC 10 and may discard the packet.

In the flow entry, as data (hereinafter, to be referred to as a rule) for specifying a flow (a data packet), any combinations of addresses and identifiers of layer 1 to layer 4 in an OSI (Open Systems Interconnection) reference model are defined, and the addresses and identifiers are included, for example, in the header data of a data packet of TCP/IP. For example, any of combinations of a physical port of layer 1; a MAC address of layer 2, an IP address of layer 3, a physical port of layer 4, and VLAN tag is set to the flow entry as a rule. However, in the present invention, a MAC address and an IP address of a transmission source are not set to the flow entry, and a destination MAC address is always set to the flow entry. Here, a predetermined range of the identifier such as a port number, the address, and the like may be set to the flow entry. For example, MAC addresses of the virtual machines VM1 and VM2 may be set as destination MAC addresses as the rule of the flow entry.

The action of the flow entry defines, for example, a method of processing a data packet of the TCP/IP. For example, information showing whether a received data packet is relayed or not, and a destination of the data packet, if the data packet is relayed, are set. Additionally, in the action, data that instructs copying or discarding of the data packet may be set.

(Flow Setting Method and Communication Method in Computer System)

Next, referring to FIGS. 3A to 3J, details of a flow setting method and a communication method in the computer system according to the present invention will be described. Flow setting for the virtual machine VM1 and flow setting for the virtual machine VM5 will be described below as an example. In addition, when the virtual machines VM1 to VM8, the physical servers 40-1 to 40-5, and the storage 50 are not distinguished relatively, they are collectively referred to as nodes.

At a time when configuration of the system has completed (or the configuration of the system has changed), the PFC 10 knows a topology of the system by a similar method to a conventional flow controller. The topology data known at this time includes data related to a connection state of the PFSs 20 and 30, the nodes (the virtual machines VM1 to VM8, the physical servers 40-1 to 40-5, and the storage), an external network not shown (for example, the internet), and the like. Specifically, as the topology data, the number of ports of a device and port destination data are related to a device identifier for specifying the PFSs 20 and 30 and the nodes, and thus the device identifier is recorded to the storage unit of the PFC 10. The port destination data includes a connection type (switch/node/external network) for specifying a connection counter side, and data for specifying the connection destination (a switch ID in case of a switch, a MAC address in case of a node, and an external network ID in case of an external network).

Referring to FIG. 3A, the PFC 10 traps an ARP request from the node to acquire (learn) a location (a MAC address) of a requesting node. For example, the ARP request destined to the virtual machine VM5 from the virtual machine VM1 is sent to the PFC 10. The PFC 10 extracts the MAC address of the virtual machine VM1 as a source node from the received ARP request. The PFC 10 defines a rule for setting the MAC address to a destination to generate a flow entry. In this case, the flow entry to all of the PFSs 20 and 30 in the system is generated. It should be noted that the flow entry to the MAC address may be set to the storage unit of the PFC 10 in advance.

Figure 3B:
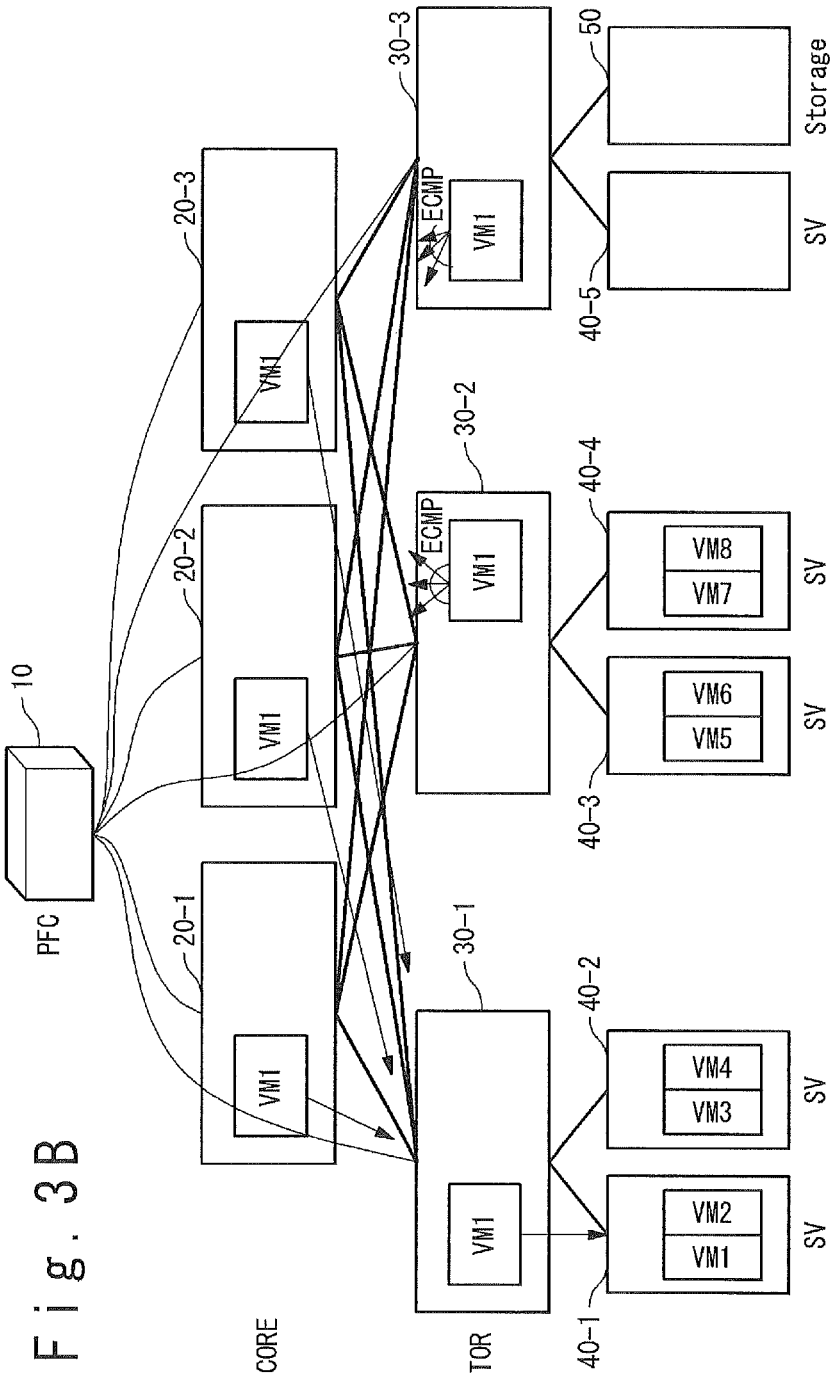
FIG. 3B is a diagram showing the example of the flow setting method and the communication method in the computer system according to the present invention.

Referring to FIG. 3B, the PFC 10 that learned the location (the MAC address) of the node registers a route to the node. For example, the PFC 10 sets to all of the PFSs 20 and 30, the flow entry defining transfer of a packet destined to the MAC address of the virtual machine VM1 and a transfer destination device. In this case, it is preferable that a flow entry is set to the PFS 30-1 so as to define a physical port connected to the virtual machine VM1 as an output destination, and a flow entry is set to the PFSs 30 at a first stage other than the PFS 30-1 so as to be load-balanced for the PFSs 20 at the second-stage or the subsequent. For example, it is preferable that the flow entry is set to the PFS 30 so as to perform the ECMP (Equal Cost Multi route) routing for the PFS 30.

In normal learning of layer 2 (L2 learning), there are cases that a LOOP is generated due to FLOODING, and that the expected learning cannot be performed due to the load balance. However, in the present invention, the OpenFlow technique is employed, and accordingly these problems do not occur.

Referring to FIG. 3C, the PFC 10 to which the flow entry is set transmits an ARP request for a destination requested from a node to all the nodes other than the node in the acquiring (learning) of a MAC address. For example, the PFC 10 transmits the ARP request destined to the virtual machine VM5 as a destination of the ARP request shown in FIG. 3A to all the nodes (the virtual machines VM2 to VM8, the SV 40-5, and the storage 50) other than the requesting virtual machine VM1.

Referring to FIG. 3D, the PFC 10 acquires (learns) the location (the MAC address) of the destination node on the basis of a reply (an ARP reply) to the ARP request shown in FIG. 3C. In the present example, the ARP reply is transmitted from the virtual machine VM5, and the PFC 10 acquires the location (the MAC address) of the virtual machine VM5 by trapping the ARP reply.

Figure 3E:
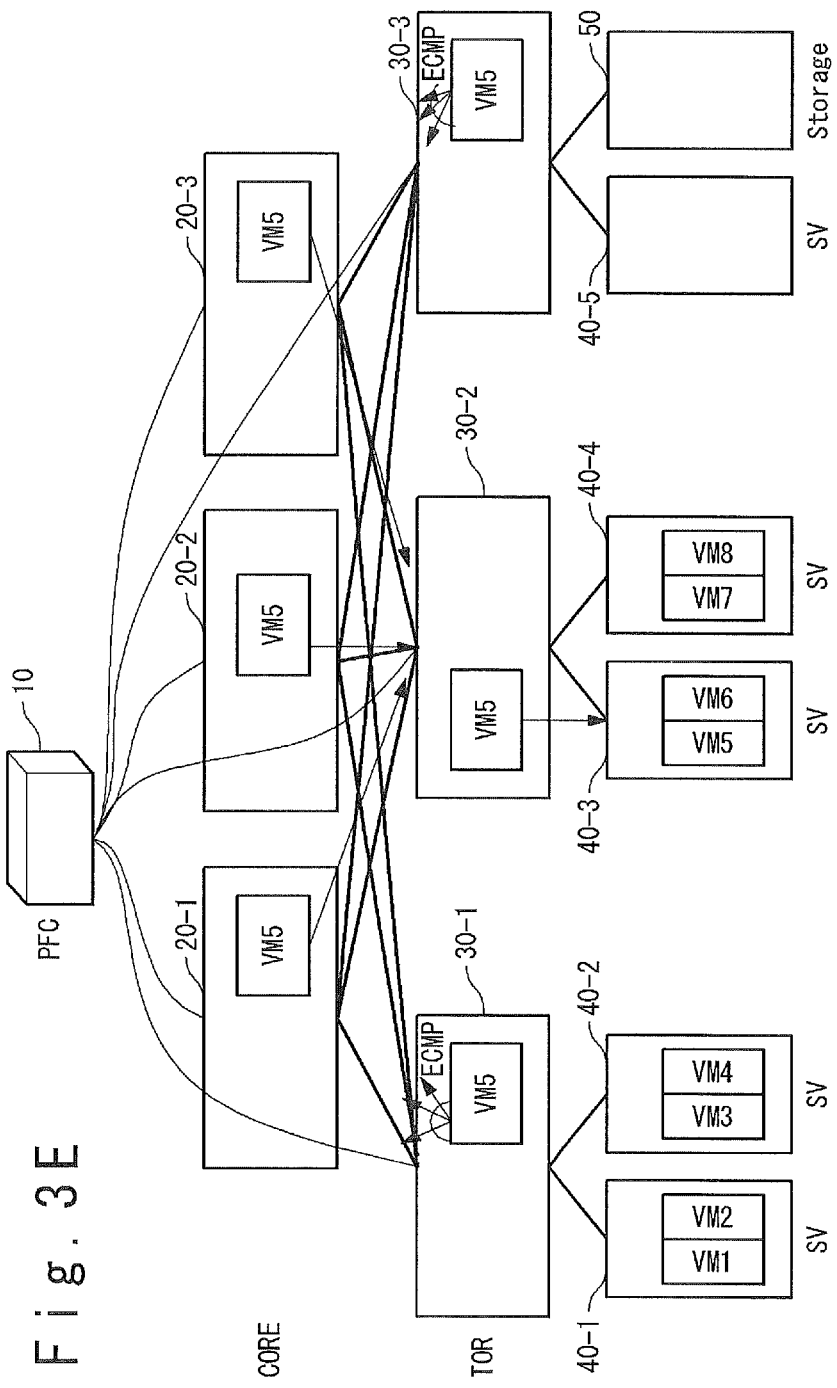
FIG. 3E is a diagram showing the example of the flow setting method and the communication method in the computer system according to the present invention.
Figure 3G:
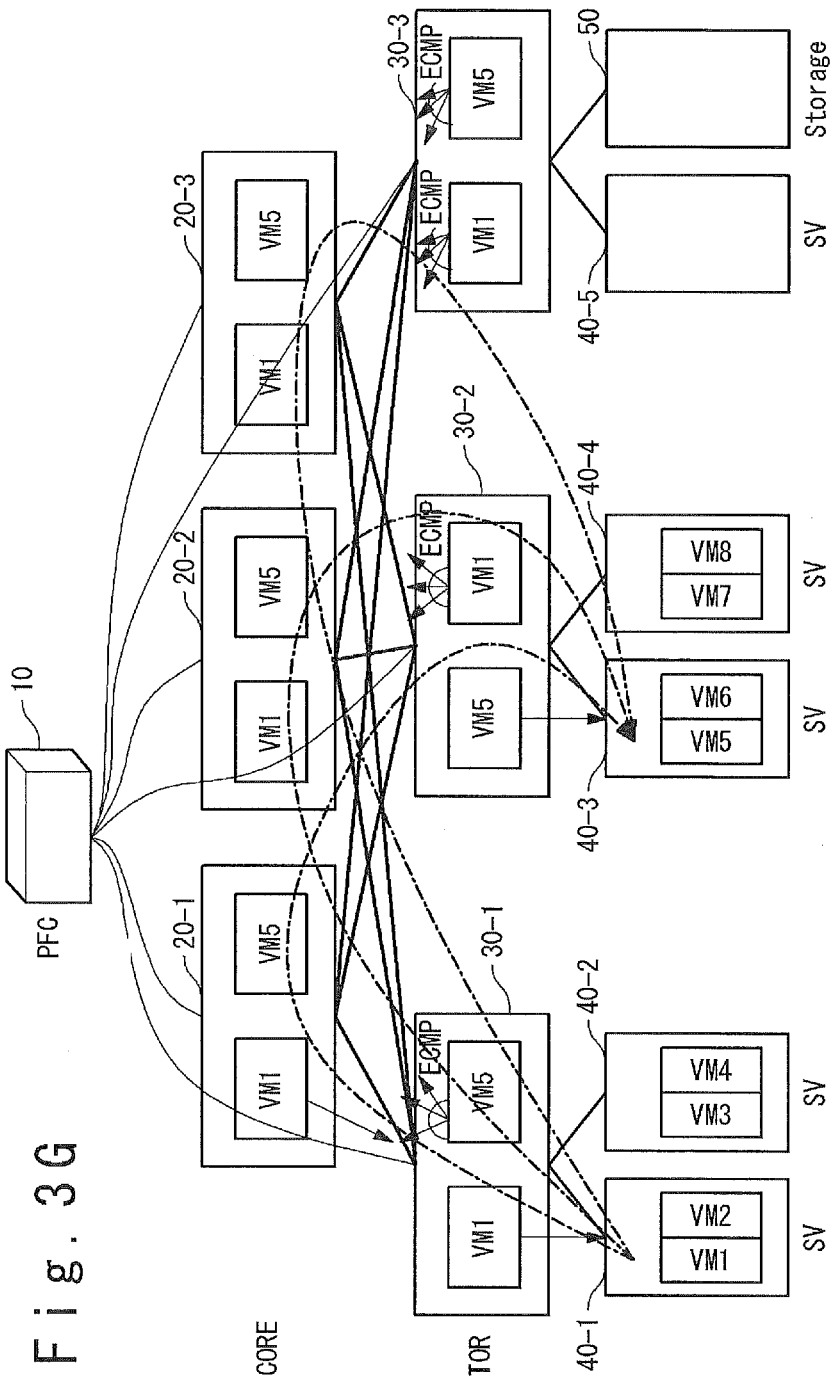
FIG. 3G is a diagram showing the example of the flow setting method and the communication method in the computer system according to the present invention.

Referring to FIG. 3E, the PFC 10 that has acquired (has learned) the location (the MAC address) of the node registers a route to the node. Here, the PFC 10 sets to all of the PFSs 20 and 30, the flow entry defining the transfer of a packet destined to the MAC address of the virtual machine VM5, and the destination device. In this case, in the same manner as described above, it is preferred that the flow entry is set to the PFSs 30 at the first stage from the HOST terminal so as to be load-balanced for the PFSs 20 at the second-stage or the subsequent.

Referring to FIG. 3F, the PFC 10 replies to the ARP request from the node shown in FIG. 3A by proxy. Here, the PFC 10 uses the MAC address of the virtual machine VM5 as a transmission source, and issues the ARP reply whose destination is the virtual machine VM1. The virtual machine VM1 receives the ARP reply to the ARP request that has been transmitted by itself, and acquires the requested MAC address of the virtual machine VM5.

In the above-mentioned operation, processing content (the flow entry) to packets respectively destined to both a destination node and a requesting source node of the ARP request is set to all of the PFSs 20 and 30 in the system. In an example shown in FIG. 3G, through the above-described operation, the flow entry to the packets respectively destined to the virtual machines VM1 and VM5 is set to all of the PFSs 20 and 30. In this way, communication destined to the virtual machine VM1, and communication destined to the virtual machine VM5 are performed normally. In this case, the packet destined to each of the destinations is transmitted through a route conforming to the flow entry defined by the destination MAC address regardless of a transmission-source.

Additionally, in order to configure a single tree structure in the Spanning Tree Protocol according to the conventional Ethernet (Registered trademark), a physical link which is not used is generated. For this reason, a plurality of routes cannot be set between specific nodes in the Ethernet (Registered trademark). However, in the present invention, a packet transfer destination is set to each of the PFSs according to the destination, so that a multi-path is formed to realize load distribution. For example, in case of the above-mentioned example, the multi-path is formed according to the flow entry in each of the communication for the virtual machine VM1 and the communication for the virtual machine VM5, and the load distribution is realized.

In the above-mentioned example, the load balance by the ECMP defined in the flow entry is employed. However, the present invention is not limited to this, and the Link Aggregation or a load distribution every flow entry may be employed.

On the other hand, in order to make it possible to transmit the ARP request and perform a bidirectional communication between a requesting source node and a destination node, the destined node acquires (learns) a location (MAC address) of the requesting source node from the PFC 10. In detail, referring to FIG. 3H, the ARP request destined to the virtual machine VM1 from the virtual machine VM5 is transmitted to the PFC 10. Referring to FIG. 3I, the PFC 10 already retaining the location (MAC address) of the virtual machine VM1 transmits the ARP reply having the MAC address of the virtual machine VM1 as the transmission source to the virtual machine VM5. The virtual machine VM5 traps this to acquire the location (MAC address) of the virtual machine VM1. In this way, as shown in FIG. 3J, the virtual machine VM5 can transmit a data packet destined to the virtual machine VM1. It should be noted that because the flow entry destined to the virtual machine VM1 and the flow entry destined to the virtual machine VM5 are independently set, a communication route from the virtual machine V1 to the virtual machine V5 and a communication route from the virtual machine V5 to the virtual machine V1 are not always same.

Through the above-described operation, both of the virtual machines VM1 and VM5 acquire (learn) mutual locations (MAC addresses), and a transfer destination to a packet destined to each of the virtual machines VM1 and VM5 is set to all of the PFSs 20 and 30. In this way, the bidirectional communication between the virtual machine VM1 and the virtual machine VM5 is made possible.

In the present invention, because the flow entry is set on the basis of a destination MAC address, the location of a transmission source node is not always necessary in setting of the flow entry. For this reason, the flow entry can be set before starting of a communication between the nodes. In addition, it is not necessary to set the flow entry for a communication route between nodes as in the conventional technique, and it is sufficient to set the flow entry of the destination MAC address to each of the PFSs. Accordingly, a consumption of resources in the whole computer system can be reduced.

Next, referring to FIG. 4, an application example of the computer system according to the present invention will be described. In the above-described example, a flow entry for a packet destined to a node is set to all of the PFSs 20 and 30. However, the present invention is not limited to this, and the nodes to which the flow entry is set may be limited to a part of the PFSs 30 directly connected to the node.

Figure 4:
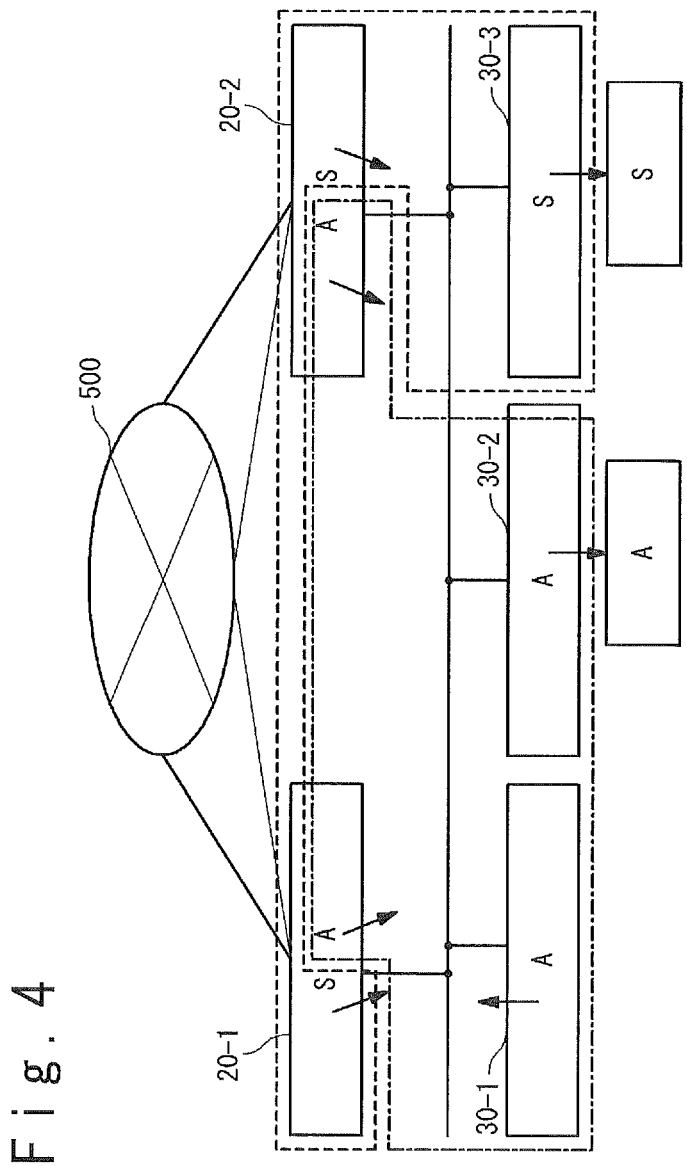
FIG. 4 is a diagram showing a configuration of a logical network divided into plurality of networks due to a flow control according to the present invention.

The computer system shown in FIG. 4 includes upper-layer switches (PFSs 20-1 and 20-2) connected to a network 500, the PFSs 30-1, 30-2, and 30-3 directly connected to the HOST terminal (not shown) such as the SV40, and nodes S and A. Here, the node A is connected to the system through the PFS 30-2, and the node S is connected to the system through the PFS 30-3.

In the present example, by the PFC 10 (not shown), a flow entry is set to the PFSs 20-1, 20-2, and 30-3 to control a flow destined to the node S, and a flow entry is set to the PFSs 20-1, 20-2, 30-1, and 30-2 to control a flow destined to the node A. In this case, a packet destined to the node S reaches the node S through a communication route passing any of the PFSs 20-1, 20-2, and 30-3, and a packet destined to the node A reaches the node A through a communication route passing any of the PFSs 20-1, 20-2, 30-1, and 30-2. That is, the node S is accommodated in a logical network configured by the PFSs 20-1, 20-2, and 30-3, and the node A is accommodated in a logical network configured by the PFSs 20-1, 20-2, 30-1, and 30-2.

As described above, the computer system shown in FIG. 4 configures one physical network. However, when the flow entry is selectively set, the computer system is divided into two logical networks. Accordingly, one physical topology can be handled as a plurality of VLANs.

As described above, the exemplary embodiments of the present invention have been described in detail. However, a specific configuration is not limited to the above-described exemplary embodiments. Various modifications within the scope of the present invention are included in the present invention. In FIG. 2, the system having the PFS group with two-stage configuration is shown as one example. However, the present invention is not limited to this, and the system may have the PFS group with a configuration of further large number of stages. In addition, an external network may be connected to the PFSs 20 through the layer 3 (L3) switch as in the conventional technique.

The present application is based on Japanese Application Number JP 2010-202468, and the disclosure thereof is incorporated herein by reference.

The invention claimed is:

1. A computer system comprising:
a controller;
a plurality of switches, each of which performs a relay operation which is defined in a flow entry set by said controller, to a packet conforming to the flow entry; and
a plurality of nodes which communicate through any of said plurality of switches,
wherein said controller sets a destination address as a rule of the flow entry and sets transfer processing to a destination node as an action of the flow entry, and
wherein each of said plurality of switches transfers the packet containing the destination address, to said destination node based on the flow entry set to said switch, regardless of a transmission source address of the packet,
wherein said controller acquires a first MAC (Media Access Control) address of a first node of said plurality of nodes in response to a first ARP (Address Resolution Protocol) request from said first node, and sets the first MAC address to each of said plurality of switches as the rule of the flow entry.

2. The computer system according to claim 1, wherein said controller sets the flow entry to each of said plurality of switches before the packet is transferred between said plurality of nodes.

3. The computer system according to claim 2, wherein said controller issues a second ARP request and sets a second MAC address of a second node which has been acquired based on the reply to the second ARP request, to each of said plurality of switches as the rule of the flow entry.

4. The computer system according to claim 1, wherein said controller transmits to the first node, an ARP reply having a MAC address of another node of said plurality of nodes as a transmission source as a reply to the first ARP request from said first node to said another node.

5. The computer system according to claim 4, wherein said controller transmits to said another node, the ARP reply to a third ARP request destined to said first node and transmitted from said another node.

6. The computer system according to claim 1, wherein said plurality of switches comprises a plurality of first switches directly connected to said plurality of nodes, and
wherein said controller sets the flow entry to optionally selected ones of said plurality of first switches without setting the flow entry to the remaining switches.

7. The computer system according to claim 1, wherein said controller sets the flow entry to each of said plurality of switches to perform ECMP (Equal Cost Multi path) routing on the packet.

8. A communication method comprising:
setting by a controller, a flow entry to each of a plurality of switches;
performing by each of said plurality of switches, a relay operation defined in the flow entry to a packet conforming to the flow entry; and
communicating between a source node and a destination node of a plurality of nodes through said plurality of switches,
wherein said setting a flow entry comprises:
setting by said controller, a destination address as a rule of the flow entry; and
setting transfer processing destined to said destination node as an action of the flow entry,
wherein said communicating comprises:
transferring by each of said plurality of switches, the packet containing the destination address to said destination node regardless of a transmission source address of the packet, and
wherein said controller acquires a first MAC (Media Access Control) address of a first node of said plurality of nodes in response to a first ARP (Address Resolution Protocol) request from said first node, and sets the first MAC address to each of said plurality of switches as the rule of the flow entry.

9. The communication method according to claim 8, wherein said setting a flow entry is performed before the packet is transferred between said plurality of nodes.

* * * * *